Feb. 22, 1927.

H. R. KOLL

MEAT HANGER

Filed Aug. 19, 1925

1,618,833

WITNESSES

M Fowler

INVENTOR
Henry R. Koll
BY
ATTORNEYS

Patented Feb. 22, 1927.

1,618,833

UNITED STATES PATENT OFFICE.

HENRY R. KOLL, OF OMAHA, NEBRASKA.

MEAT HANGER.

Application filed August 19, 1925. Serial No. 51,214.

My invention relates generally to improvements in meat hangers, more particularly to a meat hanger of the type which is adapted to support slabs of bacon while they are being smoked, and it consists in the combinations, constructions and arrangements herein described and claimed.

An object of the invention is the provision of a meat hanger which affords facilities for holding the meat firmly, although releasably, without causing holes in the meat.

A further object of the invention is the provision of a hanger which is adapted to be conveniently and easily attached to or detached from a so-called "smoke tree" or like horizontal rail and which comprises a pair of jaws adapted to be conveniently and readily adjusted with respect to each other to grip meat that has been placed therebetween or to release meat that has been gripped therebetween, the jaws being actuated continuously to grip the meat that has been placed therebetween, irrespective of the amount of shrinkage that takes place in the meat during the smoking operation.

A further object of the invention is the provision of a hanger of the character described which is substantially rust proof, adapted to be thoroughly cleaned with relatively but little labor, is strong and durable, is not likely to cause injury to a user thereof, and is thoroughly practical commercially.

Other objects and advantages of the invention will be apparent from the following description, considered in conjunction with the accompanying drawings, in which—

Figure 1:
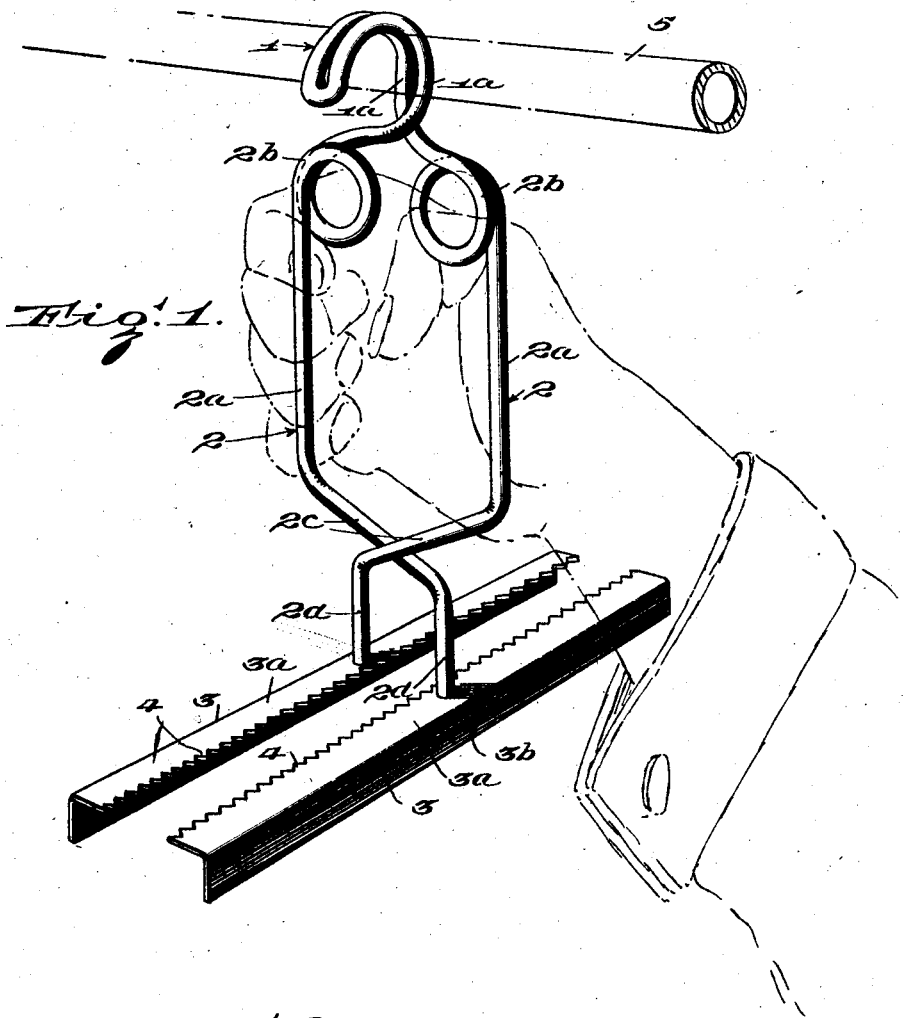
Figure 2:
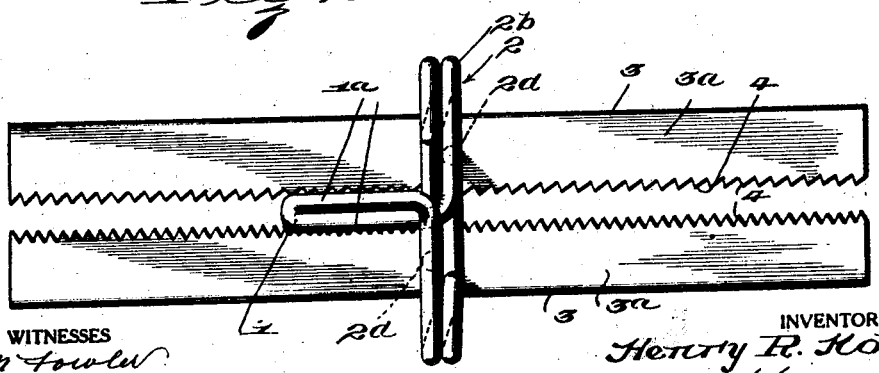

Figure 1 is a perspective view of the improved hanger applied to a horizontal support with the jaws spread apart beyond their normal position, and Figure 2 is a plan view of the hanger.

Heretofore, it has been usual to support meat, such as slabs of bacon, by means of hangers having tines or long pointed teeth which penetrate deep into the meat and sometimes through a slab of bacon or a like piece of meat.

These tines or teeth cause openings in the meat and the portions of the meat surrounding such openings may become discolored and must be removed under the provisions of meat inspection rules which are now in force. Considerable waste thus is caused.

My invention provides a hanger which is adapted to support a slab of bacon or like piece of meat without causing any cavities, incisions or openings in the meat and the waste that has resulted from the use of hangers such as ordinarily have been used prior to the invention thus is obviated. Moreover, my improved hanger can be engaged with or detached from a slab of bacon or like piece of meat more quickly and easily than is possible when any prior meat hanger of which I am aware is employed. Also, the improved hanger may be attached to or detached from a horizontal rod or like support more quickly and easily than any prior hanger of which I am aware.

The supporting means of the improved hanger is formed of a single length of spring wire which is bent intermediate its length and adjacent thereto to produce the hook 1 and the pair of supporting arms 2. The arms 2 are bent to provide the straight parallel portions $2^a$ and the torsion spring portions $2^b$ of coil form which join the upper ends of the straight portions $2^a$ to the members $1^a$ of the hook. The members $1^a$ of the hook are crossed adjacent to their junctures with the torsion springs $2^b$. The outer end portions of the arms 2 are bent to produce the crossed inclined portions $2^c$ and the straight substantially parallel end portions $2^d$ which normally are spaced a distance considerably less than the distance between the straight portions $2^a$ of the arms of the supporting structure of the hanger. The hanger comprises a pair of jaw members 3, each of which is right angular in cross sectional contour and comprises a substantially horizontal flange $3^a$ having shallow teeth 4 formed in the inner edge thereof, and a vertical flange $3^b$ which depends from the outer edge of the flange $3^a$. The extremities of the end portions $2^d$ of the arms 2 of the supporting structure of the hanger are secured rigidly in any suitable known manner in vertical openings which are provided in the flanges $3^a$ of the jaw members intermediate the length and intermediate the width of the jaw members. With this arrangement, the end portions $2^d$ of the arms of the supporting structure of the hanger are perpendicular to the flanges $3^a$ of the jaw members and the flanges $3^a$ of the jaw members lie in the same plane with the serrated edges thereof close to each other.

The jaw members are made of any suitable rust proof metal or other rust proof material which will comply with the B. A. I. meat inspection rules and the teeth 4 are not of sufficient length to cut into or penetrate the slab of bacon or other like piece of meat which has been placed between the jaw members but only of sufficient length to prevent the slab of bacon or like piece of meat from slipping from position between the jaw members.

From the foregoing description of the various parts of the device, the operation thereof may be readily understood. The holding of a slab of bacon or like piece of meat between the jaws firmly although releasably, is assured by reason of the spring action of the arms of the supporting structure of the hanger. In use, the straight portions $2^a$ of the arms of the supporting structure are gripped in the hand of the user and are forced toward each other against the action of the torsion springs $2^b$. This results in movement of the jaw members 3 away from each other and is continued until the space between the teeth of the jaws is sufficient to permit the insertion of a slab of bacon or other piece of meat therebetween. The grip on the portion $2^a$ of the arms of the supporting structure then is relaxed and the torsion springs $2^b$ will act to swing the end portions $2^d$ of the arms of the supporting structure, and the jaws 3 as well, toward each other so that the slab of bacon or like piece of meat may be firmly gripped by the jaws of the device. The hanger and the slab of bacon or like piece of meat which is gripped between the jaws thereof may be suspended from the usual "smoke tree" or like horizontal support, such as indicated at 5 in Figure 1, merely by placing the hook portion 1 of the supporting structure of the device in engagement with the support 5. To release the slab of bacon or like piece of meat, it only is necessary to press the portions $2^a$ of the arms of the supporting structure of the hanger toward each other until the jaws swing apart a distance sufficient to release the slab of bacon or other piece of meat which has been gripped therebetween. The portions $2^a$ of the arms of the supporting structure of the hanger therefore may be termed handles.

I claim:—

A hanger comprising a pair of jaw members, each right angular in cross sectional contour and each comprising a substantially horizontal flange having teeth in the edge thereof that is nearest to the other jaw member and having a substantially vertical flange depending from the horizontal flange at the outer edge of the latter, and supporting means for said jaw members comprising a pair of arms respectively secured at their lower ends to the horizontal flanges of said jaw members intermediate the length and the width of the jaw members, said arms being spring pressed toward each other and having means at their upper ends attachable to a support.

HENRY R. KOLL.